No. 12,144. REISSUED AUG. 11, 1903.

G. E. TREGURTHA.

DEVICE FOR REVERSING MOTION.

APPLICATION FILED APR. 23, 1903.

4 SHEETS—SHEET 1.

Witnesses,
A. L. Stearns
Edwin W. Brown.

Inventor,
George E. Tregurtha,
pr Norman W. Stearns,
Attorney

No. 12,144. REISSUED AUG. 11, 1903.

G. E. TREGURTHA.

DEVICE FOR REVERSING MOTION.

APPLICATION FILED APR. 23, 1903.

4 SHEETS—SHEET 2.

Witnesses,
A. L. Stearns.
Edwin W. Brown.

Inventor,
George E. Tregurtha,
pr. Norman W. Stearns,
Attorney

No. 12,144. REISSUED AUG. 11, 1903.

G. E. TREGURTHA.

DEVICE FOR REVERSING MOTION.

APPLICATION FILED APR. 23, 1903.

4 SHEETS—SHEET 3.

Witnesses,
A. L. Stearns
Edwin W. Brown

Inventor,
George E. Tregurtha,
pr Norman W. Stearns,
Attorney.

No. 12,144. REISSUED AUG. 11, 1903.
G. E. TREGURTHA.
DEVICE FOR REVERSING MOTION.
APPLICATION FILED APR. 23, 1903.
4 SHEETS—SHEET 4.
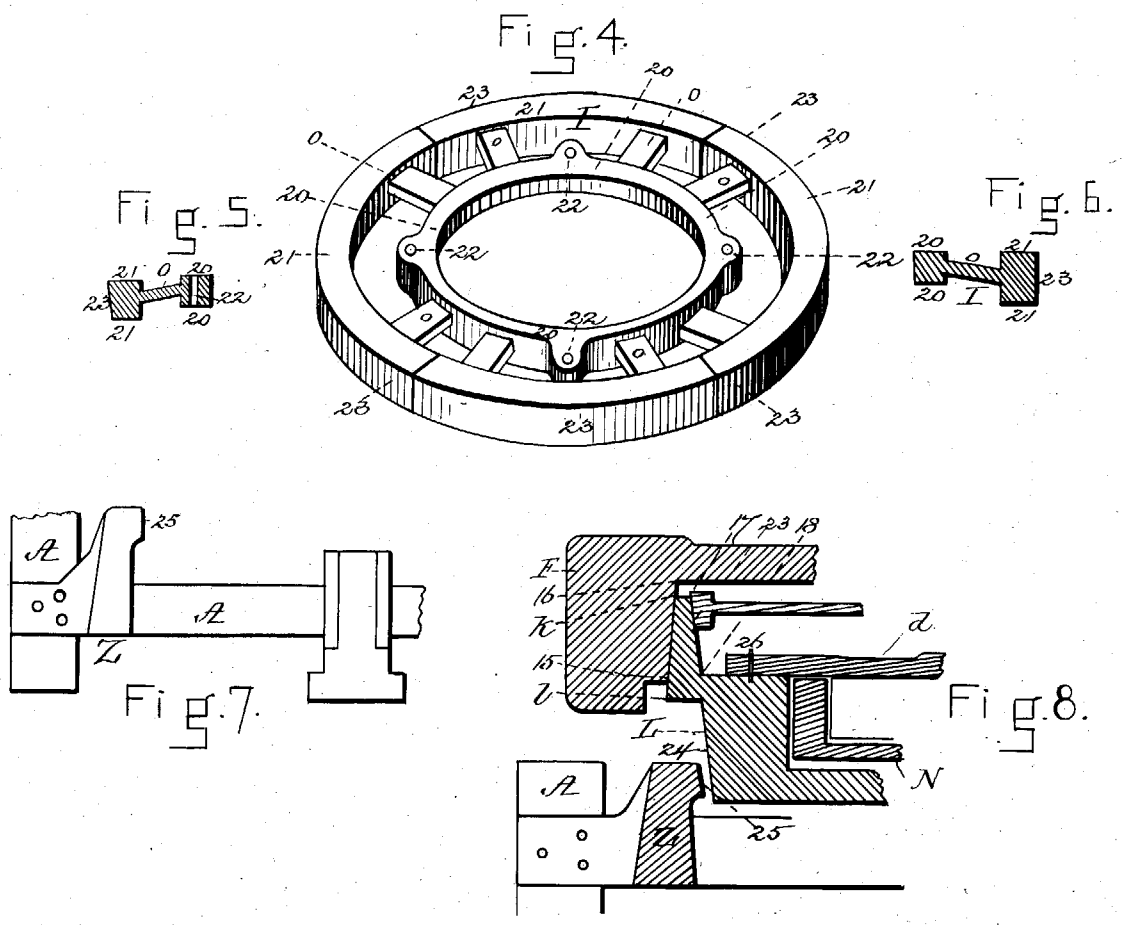
Witnesses,
A. L. Stearns.
Edwin W. Brown.
Inventor,
George E. Tregurtha,
per Norman W. Stearns,
Attorney No. 12,144. Reissued August 11, 1903.

UNITED STATES PATENT OFFICE.

GEORGE E. TREGURTHA, OF MALDEN, MASSACHUSETTS.

DEVICE FOR REVERSING MOTION.

SPECIFICATION forming part of Reissued Letters Patent No. 12,144, dated August 11, 1903.

Original No. 721,624, dated February 24, 1903. Application for reissue filed April 23, 1903. Serial No. 154,032.

*To all whom it may concern:*

Be it known that I, GEORGE EDWARD TREGURTHA, of Malden, county of Middlesex, and State of Massachusetts, have invented certain Improvements in Devices for Reversing the Motion of Propeller-Wheels, &c., of which the following is a full, clear, and exact description, reference being had to the accompanying drawings, making part of this specification, in which—

Figure 1:
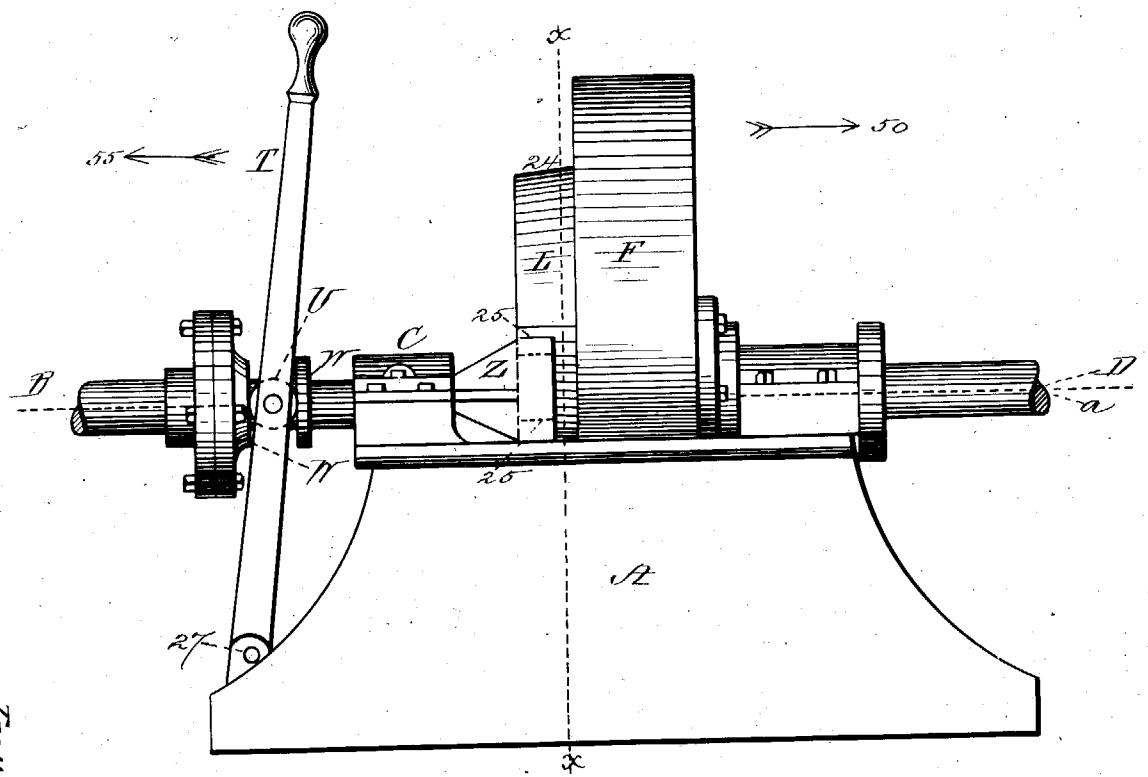
Figure 2:
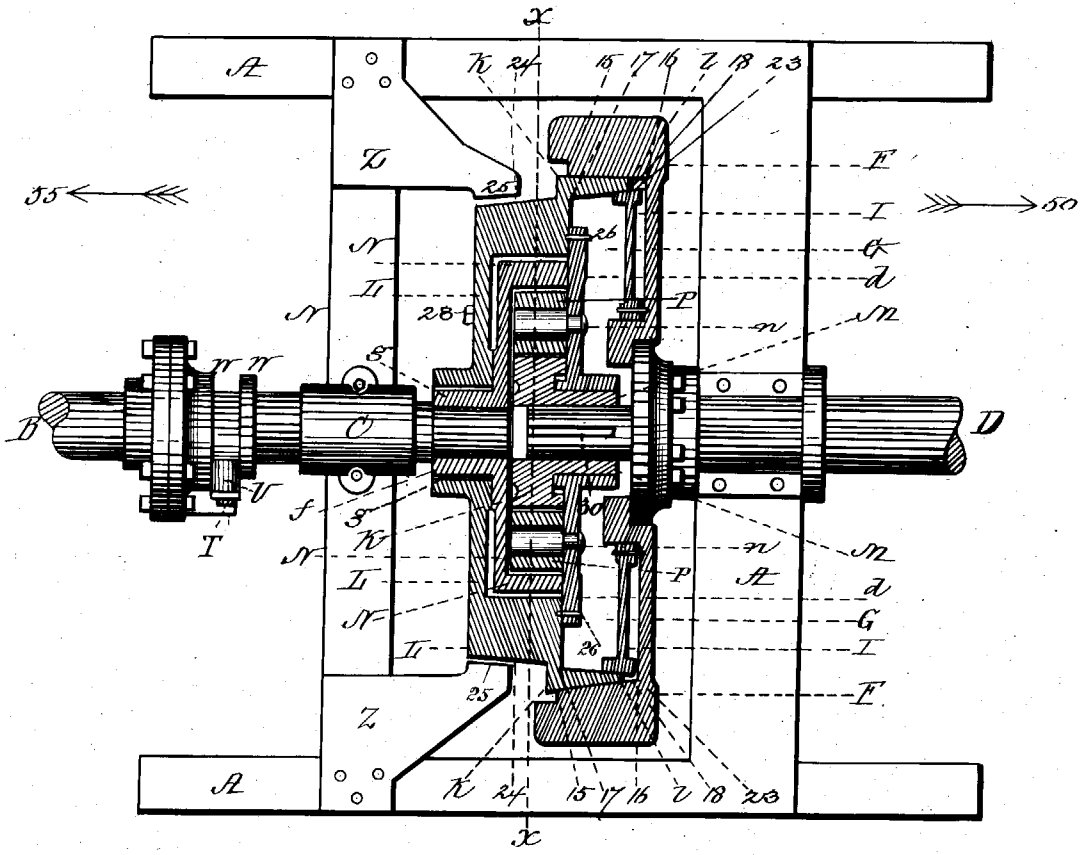
Figure 3:
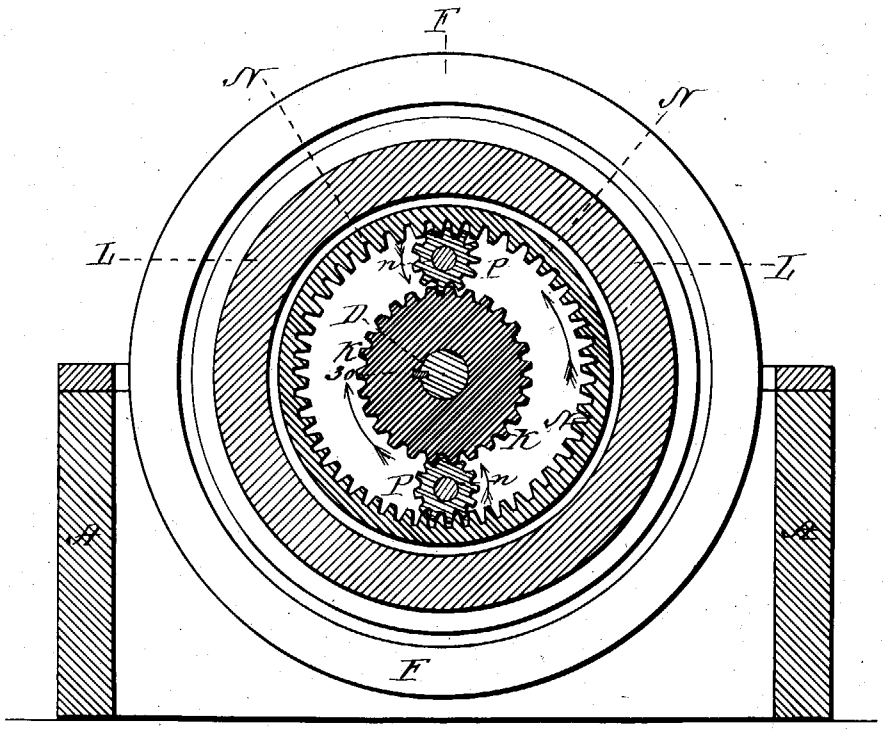

Figure 1 represents a side elevation; Fig. 2, a central horizontal section, the power-shaft and the propeller-shaft being in plan; Fig. 3, a vertical transverse section on the line *x x* of Figs. 1 and 2 looking in the direction of the dotted arrow 50 and showing the central propelling-gear and the propelling-shaft secured together by a spline in order that they will revolve together; Fig. 4, a perspective view of a plate which constitutes a new member of my clutch mechanism. Fig. 5 comprises views, one being taken through the inner rim of the clutch member in a line with the bolt-hole provided therein and the other being taken through the outer rim at a point opposite said bolt-hole. Fig. 6 is a sectional view of the clutch member, taken through one of the radial braces; Fig. 7, a detail showing a clutch member stationary and having two diametrically opposite tapering bearings, one only being shown; Fig. 8, a sectional detail showing the several clutch members enlarged and assembled together.

My present invention has particular reference to the reversing devices of propeller-wheels set forth in United States Letters Patent No. 611,187, issued to me September 20, 1898, in which certain clutch mechanism coacting with other instrumentalities were employed in applying, suspending, and changing the direction of the motion as desired. In the invention recited in said patent a revolving casing surrounding a gear secured to and carried by the power-shaft (by means of a spline connection) has a double clutch-surface at its periphery which was caused to alternately engage with a clutch-wheel secured to and revolved by the power-shaft and a stationary clutch-ring secured to the framework. By the said construction the several operations of starting, stopping, and reversing the motion of the propeller-wheel were ordinarily accomplished in a satisfactory manner; but occasionally when the reversing-lever was suddenly shifted (through inadvertence or inexperience) a lack of promptness, slight deficiency in holding ability, or want of smoothness of motion was temporarily experienced, which affected the ease of the occupant of the conveyance and in time caused the uneven wear of the parts in contact.

This invention successfully overcomes the aforesaid objections; and it consists in the novel clutching mechanism by means of which the movements of the propeller or driven shaft are controlled, which I will now proceed to describe.

In the said drawings, A represents the frame, secured in its proper position in the boat or vehicle.

B is the driver or propeller wheel shaft, the inner end of which rotates in a bearing C and its other end in a bearing. (Not shown.)

D is the driving or power shaft, located in the prolongation of the axis of the propeller-shaft, the contiguous ends of the two shafts being removed a short distance from each other and the end *a* of the power-shaft being shown as broken off, but intended to be driven by any suitable power. Secured to the driving-shaft D is a circular clutch-wheel F, having in one side a large central opening G, the inner wall of which is tapered downward and inward to form a clutch-surface 15 16, Figs. 2 and 8, the wheel F also acting as a balance-wheel. One of the prominent features of my present invention is an auxiliary clutching member consisting of a circular plate I, having an inner rim 20 and an outer rim 21, connected by radial braces *o* and secured by bolts at 22 to the inner side of the clutch-wheel F, Figs. 2 and 8. The outer rim 21 is divided into several segments or sections to provide for independent yielding or movement of said sections, and its peripheral face forms a tapering clutch-surface 23 of less diameter than the opening G in the clutch-wheel, so as to leave a vacant space at this place for the reception or entrance of the clamping-surfaces of a newly-constructed casing L, presently to be described and forming another prominent feature of this invention.

The power-shaft has secured thereto at and near its end a gear-wheel K by a spline 30, Figs. 2 and 3, which insures the positive revolution of said wheel K with the power-shaft D, and said gear-wheel K is located within a recess formed in the casing L, between it and a face-plate *d*, secured thereto by the bolts 26. The face-plate *d* is fitted to the hub M of the gear K, upon which it is free to rotate, while the casing L is mounted loosely upon the hub *f* of an internal gear N, that is keyed to the driven shaft B. The larger portion of the casing L, which is disposed over the hub of this internal gear N, terminates at its periphery in three clamping-surfaces which are formed integral therewith instead of being provided with a separate clutch-ring, as heretofore in the construction shown in United States Patent No. 611,187. The clamping-surfaces of the casing L by my improved construction are, viz., an outer one *k l*, which forms an inclined annular wall conforming to the taper of the clutch-surface 15 16 of the wheel F, with which it coacts, an inner clutching-surface 17 18 of less diameter than that of *k l* and with a taper corresponding with the outer tapering surface 23 of the newly-created clutch member I, and a third clamping-surface 24 of less diameter (here) than that of 17 18 and intended to conform to and coact with two inclined clamping-surfaces 25 25 of a casting Z, secured to the framework, these clamping-surfaces 25 25 being located diametrically opposite each other, Fig. 2, the clutch-ring (designated S in my prior patent, No. 611,187, which was a continuous stationary ring) being dispensed with and the newly-created clutch I, having only two bearing or contact surfaces, being substituted therefor.

The purpose of the divided or sectional (newly-created) clamping member I and the newly-created casing L, with its three tapering or clutching surfaces, together with the newly-constructed stationary device Z, having two separate bearing surfaces 25 25, is to enable the attendant to manipulate the reversing-lever T more easily and promptly and with an elasticity which does not impair the tenacity of the grip of the clutching-surfaces, the result being a reduction and more even wear of the parts and the avoidance of unnecessary vibrations.

As the construction of the remainder of the reversing mechanism is substantially the same as set forth in the aforesaid United States Patent No. 611,187, issued to me, and as I wish to show an operative apparatus and also the relation of my new clutching devices thereto, I will now refer to the description contained in said prior patent.

P P are two diametrically opposite pinions arranged to revolve on stationary studs *n n*, riveted to the side or plate *d* of the casing L, said pinions engaging with the gear K and also with the internal gear N, keyed to the driven shaft B. (See Fig. 2 of the accompanying drawings.) The gear K by means of a spline 50 is so connected with the power-shaft that it must revolve in common therewith, while it is also free to slide thereon and have a limited amount of longitudinal motion on the driving-shaft D. Means for oiling the gearing may be provided through a hole 28 in the casing L, Fig. 2, leading to another hole in the internal gearing N, the holes being controlled by a removable plug. The reversing-lever T is pivoted at 27 to the frame A and is provided with a friction-roll V, pivoted on its inner side and located between two circular flanges W on the propeller-wheel shaft B, by which construction when the lever is swung to the left in the direction of the dotted arrow 55 the propeller-wheel shaft B is moved in the same direction, and the casing L, with its friction or clamping surfaces, will be moved, so as to disengage its clutching-surface *k l* from the clamping-surface 15 16 of the clutch-wheel F and also withdraw the clutching-surface 17 18 of the casing L from the tapering surface 23 of the new clamping member I, simultaneously with which the third clamping-surface 24 of the casing will be brought into a position to engage with the clamping-surfaces 25 25 of the stationary clutching device Z, secured to the frame, which will stop the casing L from rotation. Whatever be the position to which the friction member L of the clutch is moved by the lever T it is necessary that engagement be maintained between the gearing that connects the shafts B and D, and this I accomplish by my present form of this invention (herein illustrated) by so mounting the gear K that while it is free to have a limited amount of longitudinal sliding motion on the spline 30, which connects it with the shaft D, the said gear must at all times rotate simultaneously and in the same direction with the driving-shaft D. The aforesaid connection of the gear K and the driving-shaft D, so as to positively insure the revolution of the gear simultaneously with the said shaft, and also to admit of its sliding longitudinally thereon, are the functions to be performed to render the construction (herein recited) operative and forms a vital feature of this form of my invention. The parts being in the position seen in Fig. 2, when power is applied to the driving-shaft D the clutch-wheel F is turned, and as the casing L is frictionally engaged by its beveled surface *k l* with the internal beveled surface 15 16 of the clutch-wheel F and the beveled surface 17 18 of said casing, also frictionally engaged with the beveled surface 23 of the clamping member I, the casing is rotated therewith, and as the pinions P P are free to revolve on their studs riveted to the casing L the pinions will be carried around with the latter without revolving on their studs, but will cause the internal gear N to rotate with the casing L, which being keyed to the propeller-wheel shaft (driven shaft) will be revolved in common with said shaft in the same time and direction, and carry the boat, &c., forward. To reverse the direction of the boat, move the handle of the reversing-lever T to the left, which moves the propeller-shaft in its bearings and also the internal gear N, secured to said shaft, and as the casing incloses the internal gear they are both moved in the same direction sufficiently to withdraw the clutching-surfaces of the casing from those of the clutch-wheel F and new clutch member I and enable the third clutching-surface 24 of the casing L to engage with the two clutching-surfaces 25 25 of the stationary clutch Z, secured to the frame, which prevents the revolution of the casing. The central gear K by means of the spline connection 30 is now carried around and by the driving or power shaft D, which revolves the intermediate pinions P P, which in turn drive the internal gear N in the opposite direction to the rotation of the power-shaft, and as the internal gear is secured to the driven shaft (propeller-wheel shaft) the latter is caused to revolve in the opposite direction to the driving-shaft, thus reversing the direction of the boat without changing the direction of the power.

To stop the rotation of the propeller-wheel in either direction and without changing the motion of the driving-shaft D, it is only necessary to operate the reversing-lever, so as to bring the casing L into such position that all the clamping-surfaces will be disengaged—that is, the clamping-surfaces *k l* 17 18 will be severally withdrawn from contact with the clamping-surfaces 15 16 of the clutch-wheel F and from the bevel 23 of the member I, and the clutch-surface 24 from the two beveled surfaces 25 25 of the stationary clutch Z; but as the casing in this released position will revolve with the power-shaft and carry around therewith bodily the pinions P P they will have no influence on the internal gear N to move the propeller-wheel shaft B, and consequently the boat will be stationary although the driving-shaft may be in motion.

Although the clutching-plate I furnishes additional frictional surface, it may be omitted or may be used without being divided into segments, and the newly-constructed casing formed integral with one of its sides and having but two peripheral clutching-surfaces *k l* and 24, coacting with the tapering surfaces 15 16 of the balance clutch-wheel F, and the surfaces 25 25 of the newly-constructed stationary clutching device Z may be employed with more satisfactory results than when the casing L as heretofore constructed was used with the continuous clutching-surface of a stationary clutching device; but I prefer the employment of a sectional auxiliary clutch-plate I, with the newly-constructed casing having three clutching-surfaces and the newly-constructed stationary clutch with two clamping-surfaces, as thereby I obtain the best possible results, as herein previously recited.

I claim—

1. In combination, a driving-shaft, a driven shaft, a clutch member carried by the driving-shaft, and having two oppositely-inclined friction-surfaces, one internal and the other external, a sliding clutch member having two clutch-faces arranged to engage respectively with the two clutch-faces of the clutch member carried by the driving-shaft, and planetary gearing arranged between the two shafts, the revolving pinions of which are carried by the sliding clutch member, substantially as set forth.

2. In combination, a driving-shaft and a driven shaft, a clutch-wheel secured to the driving-shaft, an auxiliary clutch member secured to the clutch-wheel, a casing adapted to revolve with and slide longitudinally relative to the driving-shaft and having three clutching-surfaces, two of which surfaces are arranged to engage respectively with the clutch-surface of the clutch-wheel and that of its attached clutching member, a stationary clutch device secured to the framework, and with which stationary clutch, the third clutching-surface of the casing engages, a gear secured to the driving-shaft and revolving therewith and adapted to slide longitudinally thereon, a gear secured to the driven shaft, one or more intermediate pinions pivoted to said casing, and arranged to engage with the driving-shaft gear and the driven-shaft gear, and a mechanism for moving the clutch-endowed casing in opposite directions, substantially as set forth.

3. In combination, a driving-shaft and a driven shaft, a clutch-wheel secured to the driving-shaft, a sectional auxiliary clutch member secured to the clutch-wheel, a casing adapted to revolve, and slide longitudinally relative to the driving-shaft, and having three clutching-surfaces, two of which are arranged to engage respectively with the clutch-surface of the clutch-wheel and the clutch-surface of its attached sectional member, a stationary clutch device formed with two clamping-surfaces and secured to the framework, and with which stationary clutch, the third clutching-surface of the casing engages, a gear adapted to revolve with and slide longitudinally upon the driving-shaft and inclosed by said casing, a gear secured to the driven shaft, one or more intermediate gears pivoted to said casing and adapted to engage with the driving-shaft gear and the driven-shaft gear and mechanism for moving the clutch-formed casing back and forth upon the driving-shaft, constructed and arranged to operate substantially as specified.

4. In combination, a driving-shaft and a driven shaft, a clutch-wheel secured to the driving-shaft, a sectional auxiliary member secured to the clutch-wheel, a casing adapted to revolve and slide longitudinally on the driving-shaft and having three clutching-surfaces, two of which are caused to engage respectively with the clutch-surface of the balance clutch-wheel, and the clutch-surfaces of its attached sectional member, a stationary clutch device formed with two diametrically opposite clamping-faces and secured to the framework, and with which stationary clutch, the third clutching-surface of the casing engages, a gear adapted to revolve with and slide longitudinally on the driving-shaft and inclosed by said casing, an internal gear N carried by the driven shaft, one or more intermediate pinions pivoted to said casing and adapted to engage with the driving-shaft gear and the driven-shaft gear, and mechanism for moving the clutch-acting casing forward and back upon the driving-shaft, constructed and arranged to operate, substantially as set forth.

In testimony whereof I have signed my name to this specification in the presence of two subscribing witnesses.

GEORGE E. TREGURTHA.

Witnesses:

FREDERICK S. MANN,

JAMES TREGURTHA.